(12) United States Patent
Ostermeier et al.

(10) Patent No.: US 8,042,926 B2
(45) Date of Patent: Oct. 25, 2011

(54) CARTRIDGE FOR AN EJECTABLE COMPOUND

(75) Inventors: Peter Ostermeier, Diessen (DE); Franz Heiberger, Stettfurt (CH); Ingo Loeschky, Kaufering (DE); Rainer Strobel-Schmidt, Bad Woerishofen (DE); Christian Hefele, Breitenbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 534 days.

(21) Appl. No.: 12/287,032

(22) Filed: Oct. 2, 2008

(65) Prior Publication Data
US 2009/0122123 A1     May 14, 2009

(30) Foreign Application Priority Data
Oct. 11, 2007   (DE) .................. 10 2007 000 850

(51) Int. Cl.
*B41J 2/175* (2006.01)
(52) U.S. Cl. ....................................... 347/86
(58) Field of Classification Search .................. 347/86, 347/84, 85, 87, 89, 93; 222/145.5, 145.6, 222/137
See application file for complete search history.

(56) References Cited

U.S. PATENT DOCUMENTS
6,186,363 B1   2/2001   Keller

FOREIGN PATENT DOCUMENTS
EP            723 807        7/1996
WO      WO 2008/113196       9/2008

*Primary Examiner* — Kristal Feggins
(74) *Attorney, Agent, or Firm* — Abelman, Frayne & Schwab

(57) ABSTRACT

A cartridge (11) used as a container for a compound that can be ejected by an ejection device, has two receptacles (12, 16) and a head part (21), each receptacle (12, 16) having a receptacle chamber (13, 17) for components of the compound with the head part (21) having a base plate (22) with an outlet opening (23) for the compound and, at a contact surface (24) of the base plate (22), two guide portions (25, 26) for joining to an end (14, 18) of the corresponding receptacle (12, 16), a guide element for the receptacle (16) arranged adjacent to the guide portion (26) at the contact surface (24) of the head part (21).

3 Claims, 2 Drawing Sheets

CARTRIDGE FOR AN EJECTABLE COMPOUND

BACKGROUND OF THE INVENTION

1. Field of the Invention

The invention relates to a cartridge as a container for a compound that can be ejected by an ejection device and having at least one receptacle with a receiving chamber for the compound, and a head part having a base plate with an outlet opening for the compound and, at a contact surface of the base plate, at least one guide portion for coupling with an end of the receptacle.

2. Description of the Prior Art

A cartridge of this kind serves as a storage package of the compound to be ejected. The cartridge can be placed in an exchangeable manner in a receptacle of an ejection device such as a dispenser. The compound, for example, a mortar compound or sealing compound, is arranged either directly or packaged, e.g., in a foil bag, in the receptacle chamber of the receptacle. The compound located in the cartridge is applied to an application site with the ejection device.

DE 91 00 054 U1 discloses a cartridge of the generic type which has two hollow-cylindrical receptacles, each with a receptacle chamber for separately stored components of a compound to be ejected which are packaged in foil bags. The cartridge has a head part having a base plate with an outlet opening for the compound and, at a contact surface of the base plate, two hollow-cylindrical guide portions for joining to one end of the receptacle. In the joined state of the cartridge, the ends of the foil bags protrude into the guide portions, and the receptacles are slid over the guide portions so that the respective end of the receptacle contacts the contact surface of the head part.

In case of two-component or multi-component compounds, there are usually more parts by volume of a component A than there are of the at least one additional component B with respect to the total volume of the compound. The ratio of component A to component B varies, for example, in a range from 10:1 to 1:1. With one type of ejection device, cartridges or containers can be ejected with different ratios of component A to component B. Each receptacle of the ejection devices for the cartridges has a fixed length so that the receptacle chambers are adapted with respect to their cross-sectional opening for varying the components relative to one another.

In order to eject different amounts of single-component compounds with one type of ejection device, each receptacle has a length corresponding to the length of the receptacle, but has a corresponding size with respect to the cross-sectional opening corresponding to the volume to be received.

The known solution is disadvantageous in that a receptacle whose cross-section is bigger, for example, than that of the respective guide portion can nevertheless be joined with the latter. However, when parts of the cartridge are joined in this way, an open gap remains at the sides of the guide portion, and the compound can exit through this gap, for example, into the receptacle of the ejection device when the compound is being ejected. Further, in case of multi-component compounds, not only can the receptacle of the ejection device be contaminated, but the correct mixture ratio of the compound dispensed at the application site is no longer ensured.

SUMMARY OF THE INVENTION

It is the object of the invention to provide a cartridge with a head part and at least one receptacle which can be joined together in a definite manner and ensure a highly reliable application.

This and other objects of the present invention, which will become apparent hereinafter, are achieved by arranging according to the invention, at least one guide element for the receptacle adjacent to the guide portion at the contact surface of the head part.

The at least one guide element prevents the joining of a receptacle with the one guide portion at the head part when the receptacle does not match the guide portion in question. When a head part which is not suitable for the receptacle is arranged at this receptacle, the total length of the incorrectly assembled cartridge is so large that the user cannot correctly insert it into the receptacle of an ejection device. Accordingly, the user immediately notices that there is something wrong with this cartridge and can react accordingly before the start of the ejection process. This prevents the compound to be ejected from being ejected of an incorrectly assembled cartridge and the consequent disadvantages. The at least one guide element substantially forms a coding at the head part.

A plurality of guide portions are preferably provided at the head part for guiding the respective ends of a plurality of receptacles, each for a component of a multi-component compound, and the at least one guide element is provided at least adjacent to one of the guide portions. In case of multi-component compounds with different ratios of the components with respect to one another, only one of the components, e.g., the hardener component in a mortar, usually has a decisive difference in the cross-sectional opening of the receptacle chamber of the receptacle. Accordingly, in most applications, it is sufficient to arrange only one guide element next to one of the guide portions in order to prevent incorrect application. When at least two receptacles are joined with a head part which is not formed for these receptacles, the ends of the receptacles remote of the head part do not lie in a plane that is defined by one of the ends, so that the applicant can immediately detect the incorrect application visually and the incorrectly joined cartridge cannot be inserted into the receptacle of an ejection device. In a variant of this, a guide element is provided next to every guide portion for a corresponding coding of the head part.

The at least one guide element is preferably a guide projection protruding from the contact surface. The guide projection is a projection which, for example, penetrates into a receiving ring formed at the respective end of the receptacle. When a receptacle is joined with a guide portion that does not match it, the respective end of the receptacle contacts the free end of the guide projection so that the incorrectly joined cartridge has an excess length with respect to the corresponding length of the receptacle of the ejection device.

The at least one receptacle preferably has a wall thickness which extends from a side of the receptacle facing the receptacle chamber to a side of the receptacle directed radially outwardly, and the guide projection is provided at a distance from the guide portion corresponding to 0.9-times to 1.1-times the wall thickness of the receptacle. When a receptacle is joined with a guide portion that matches it, the respective end of the receptacle penetrates into the free chamber between an outer contour of the guide portion and a contour of the guide projection facing the latter. When the receptacle is unsuitably dimensioned for joining with the respective guide portion, the respective end of the receptacle abuts against the free end of the guide projection and prevents this cartridge from being properly used in an ejection device as has already been described. At least the head part and usually also the at least one receptacle are advantageously made of plastic. Because of the elasticity of the plastics that are usually used, the distance between the guide projection and the corresponding guide portion can also be less than 1.0-times the wall thickness of the respective receptacle.

In another embodiment according to the invention, the at least one guide element is a recess which is arranged in the contact surface and into which an insertion projection protruding from the corresponding end of the respective receptacle can be inserted. When a receptacle which does not match the corresponding guide portion is joined with the latter, the insertion projection at the corresponding end of the receptacle abuts at the contact surface of the head part so that the incorrectly joined cartridge likewise has an excess length with the above-mentioned advantages for visual and tactile perception. A correct joining of an incorrectly oriented receptacle is likewise prevented because the insertion projection at the receptacle cannot penetrate into the recess in the contact surface of the head part. When the receptacle is joined with the respective guide portion in the reverse manner so that the insertion projection comes to rest remote of the head part, this insertion projection which protrudes beyond the end remote of the head part prevents the complete cartridge comprising a head part and at least one receptacle from being correctly introduced or inserted into the receptacle of an ejection device.

The at least one guide portion is preferably a circumferential wall portion projecting from the contact surface of the head part, and the at least one guide element is arranged on the inner side of this wall portion. This arrangement also prevents the unintentional use of an incorrectly assembled cartridge in an ejection device in case of head parts in which the receptacle is received by the corresponding guide portion when they are joined.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show.

Identical parts are provided with the same reference numerals in the drawings.

DETAILED DESCRIPTION OF THE PREFERRED EMBODIMENTS

Figure 1:
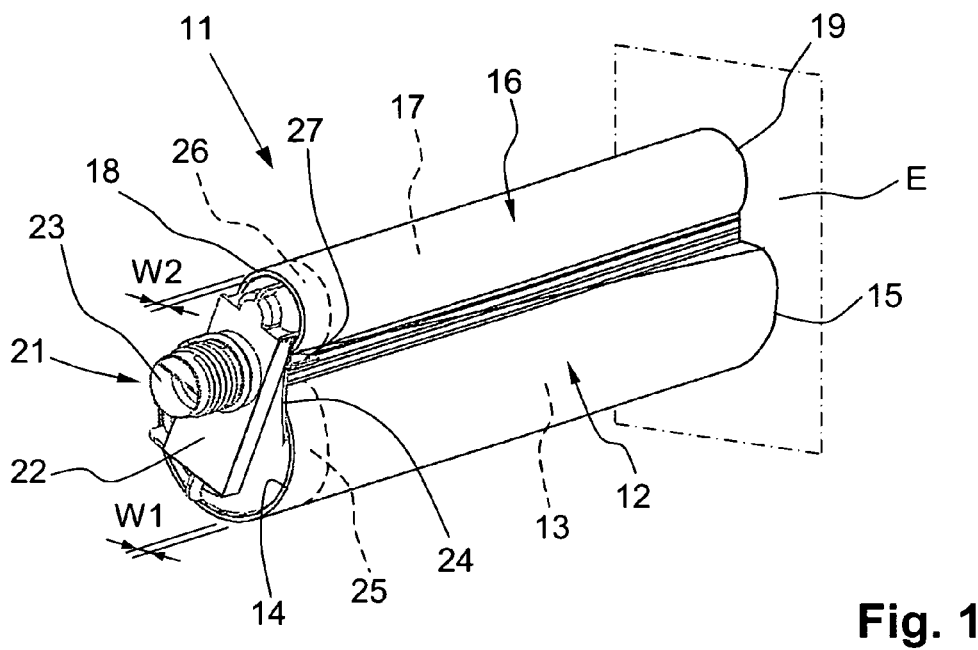
FIG. 1 a perspective view of the first embodiment of a correctly joined cartridge.
Figure 3:
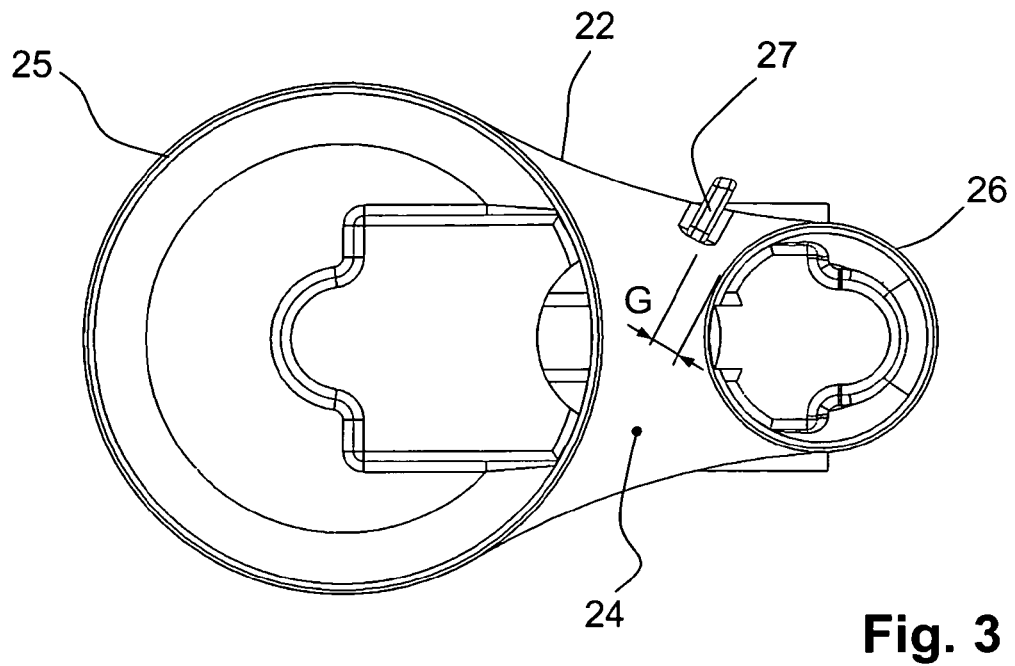
FIG. 3 a head part in horizontal section.

The cartridge 11 shown in FIGS. 1 and 3 serves as container for a compound which can be ejected by an ejection device, not shown, and includes two receptacles 12 and 16 and a head part 21. The hollow-cylindrical receptacle 12 has a receptacle chamber 13 for an A component of the compound and a thickness W1 which extends between the side of the receptacle 12 facing the receptacle chamber 13 and the side of the receptacle 12 that is directed radially outwardly. The hollow-cylindrical receptacle 16 has a receptacle chamber 17 for a B component of the compound to be ejected and a wall thickness W2 which extends between the side of the receptacle 16 facing the receptacle chamber 17 and the side of the receptacle 16 which is directed radially outwardly. The receptacle 16 has a receptacle chamber 17 with a smaller cross-section than the receptacle 12.

The head part 21 has a base plate 22 with an outlet opening 23 for the compound and, at a contact surface 24 of the base plate 22, two guide portions 25 and 26 for joining with one end 14 and 18, respectively, of the receptacle 12 and 16, respectively, which guide portions 25 and 26 are constructed as circumferential wall portions and project from the contact surface 24. A guide element which takes the form of a guide projection 27 projecting from the contact surface 24 and which is arranged adjacent to the guide portion is provided at the contact surface 24 of the head part 21. The guide projection 27 is provided at a distance G from the guide portion 26 which corresponds to 1.0-times the wall thickness W2 of the receptacle 16.

In the joined state of the cartridge 11, the end 18 of the receptacle 16 penetrates into the free chamber between the guide projection 27 and the outer contour of the guide portion 26 until the latter contacts the contact surface 24. Since the receptacle 16 and the receptacle 12 have the same longitudinal extention, their ends 15 and 19 remote of the head part 21 lie in a plane E which is defined by the end 15 of the receptacle remote of the head part 21. This complete cartridge 11 has head part 21, and receptacles 12 and 16 can be inserted into the receptacle of an ejection device, and the compound located herein can be dispensed at a desired application site by means of the ejection device. In a head part 21 with a plurality of guide portions 25 and 26, a guide element can be provided at the head part adjacent to each of these guide portions in an embodiment which is not shown.

Figure 2:
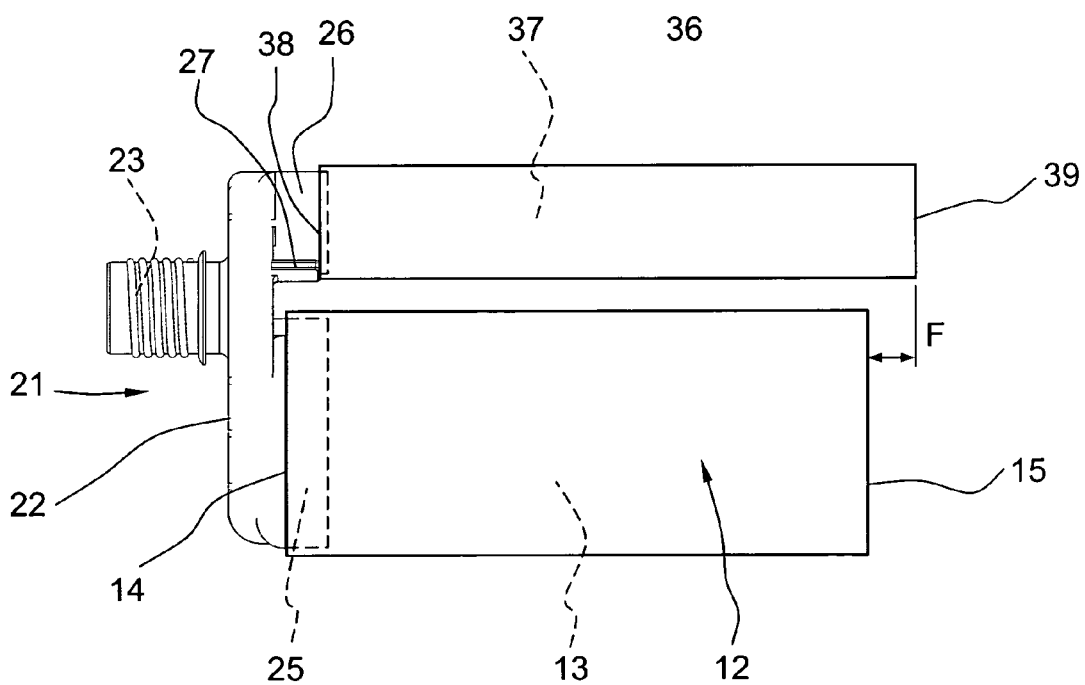
FIG. 2 a side view of an incorrectly joined cartridge.

If it is attempted, as is shown in FIG. 2, to join a receptacle 36 with a receptacle chamber 37 that is larger in cross-section than the receptacle chamber 17 of the receptacle 16 with the guide portion 26 at the head part 21, the respective end 38 of the receptacle 36 abuts at the free end of the guide projection 27. Since the length of the receptacle 36 corresponds to the length of the receptacle 16, the end 39 of the receptacle 36 remote of the head part 21 projects beyond the end 15 of the receptacle 12 remote of the head part 21 by the excess length F. The user immediately notices that an incorrect head part 21 or an incorrect receptacle 36 was used. If the applicant still tries to insert the incorrectly joined cartridge into the receptacle of the ejection device, not shown here, the excess length prevents a correct introduction or insertion into the receptacle of the ejection device. An incorrect application with an incorrect mixing ratio or a contamination of the receptacle of the ejection device due to an incorrectly joined cartridge is prevented.

When the two receptacles 12 and 36 form one part, the incorrectly joined cartridge has a total length which prevents correct insertion into the receptacle of the ejection device.

Figure 4:
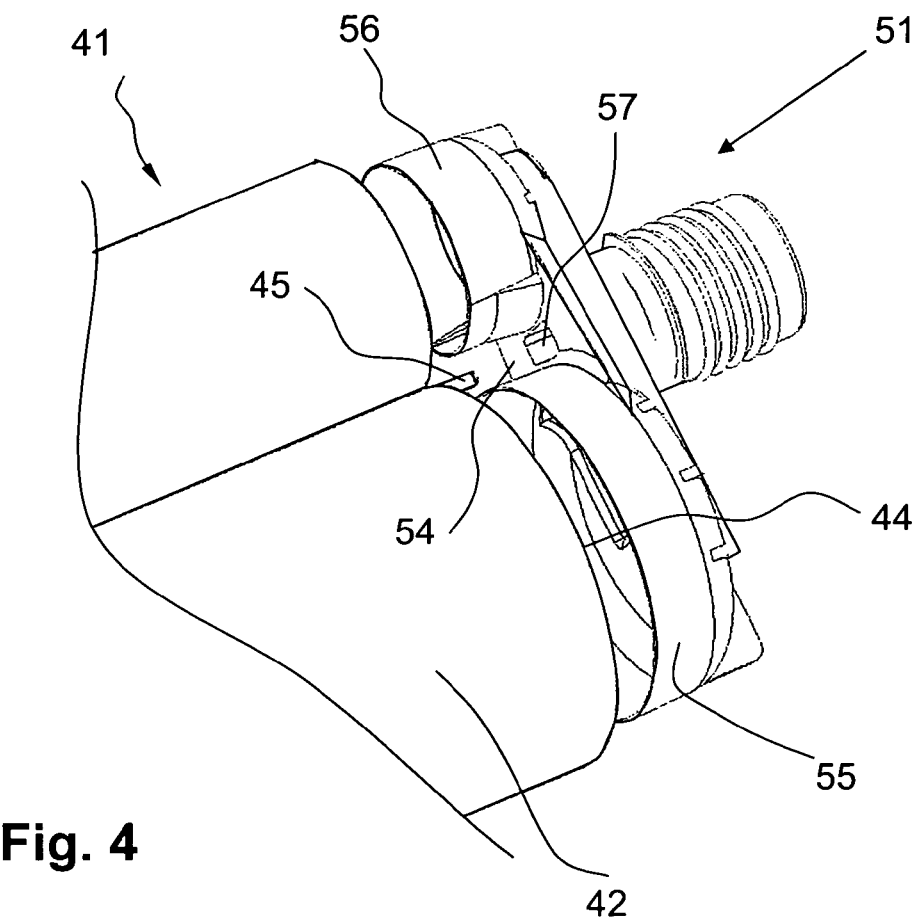
FIG. 4 an exploded view of a second embodiment of a head part with an end area of a receptacle.

FIG. 4 shows an alternative embodiment of the invention in which the guide portion is a recess 57 arranged in the contact surface 54 of the head part 51. The recess 57 is arranged in the circumferential wall portions which form the guide portions 55 and 56 and which project from the contact surface 54 of the head part 51. At a corresponding end 44 of the respective receptacle 42 which can be joined with the guide portion 55, a projecting insertion projection 45 is provided which can be inserted into the recess 57. If the receptacle 42 does not match the guide portion 55 or if the receptacle 42 is joined with the head part 51 in a misaligned manner, the insertion projection, which contacts the contact surface 54 or guide portion 55, prevents a correct joining of the parts to form a cartridge 41 that can be placed in a receptacle of an ejection device, not shown. In an alternative embodiment, not shown, the recess 57 is arranged at the inner side next to one of the circumferential wall portions which form the guide portions 55 and 56.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A cartridge used as container for a compound that can be ejected by an ejection device, the cartridge comprising at least one receptacle (12, 16, 36; 42) having a receiving chamber (13, 17, 37) for the compound; a head part (21; 51) including a base plate (22) with an outlet opening (23) for the compound, a contact surface (24; 54) and at least one guide portion (25, 26; 55) provided at the contact surface (24; 54) for joining to an end (14, 18, 38; 44) of the at least one receptacle (12, 16, 36; 42); and at least one guide element for the at least one receptacle (16, 36; 42) arranged adjacent to the guide portion (26; 55) at the contact surface (24; 54) of the head part (21; 51), wherein the at least one receptacle 12, 16, 36; 42) has a wall thickness (W1, W2) which extends from a side of the receptacle (12, 16, 36; 42) facing the receptacle chamber (13, 17, 37) to a side of the receptacle (12, 16, 36; 42) directed radially outwardly, and the at least guide element is formed as a guide projection (27) protruding from the contact surface (24) of the head part (21) and provided at a distance (G) from the guide portion (26) of the head part (21) corresponding to 0.9-times to 1.1-times the wall thickness (W2) of the receptacle (16).

2. A cartridge according to claim 1, wherein a plurality of guide portions (25, 26; 55) are provided at the head part (21; 51) for guiding the respective ends (14, 28; 44) of a plurality of receptacles (12, 16; 42), each for a component of a multi-component compound, wherein the at least one guide element is provided at least adjacent to one of the guide portions (26; 55).

3. A cartridge according to claim 1, wherein the at least one guide portion (25, 26; 55) is a circumferential wall portion projecting from the contact surface (24; 54) of the head part (21; 51), and the at least one guide element is arranged on the inner side of the wall portion.

\* \* \* \* \*